Feb. 16, 1965   D. G. SEYMOUR   3,169,747
ROTARY BLADED POWER CONVERSION MACHINES
Filed Jan. 2, 1962   2 Sheets-Sheet 1
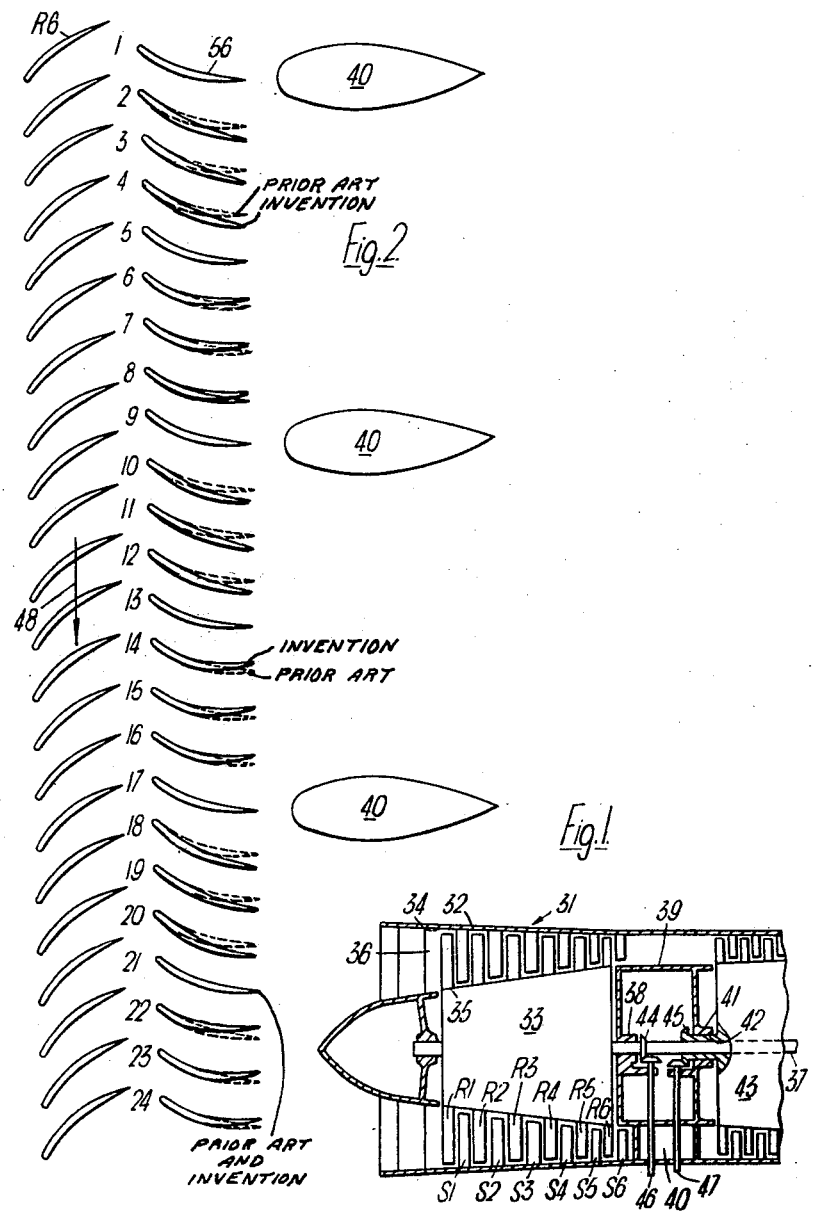
Inventor
Donald Glenfield Seymour
By
Bailey, Stephens & Huettig
Attorneys

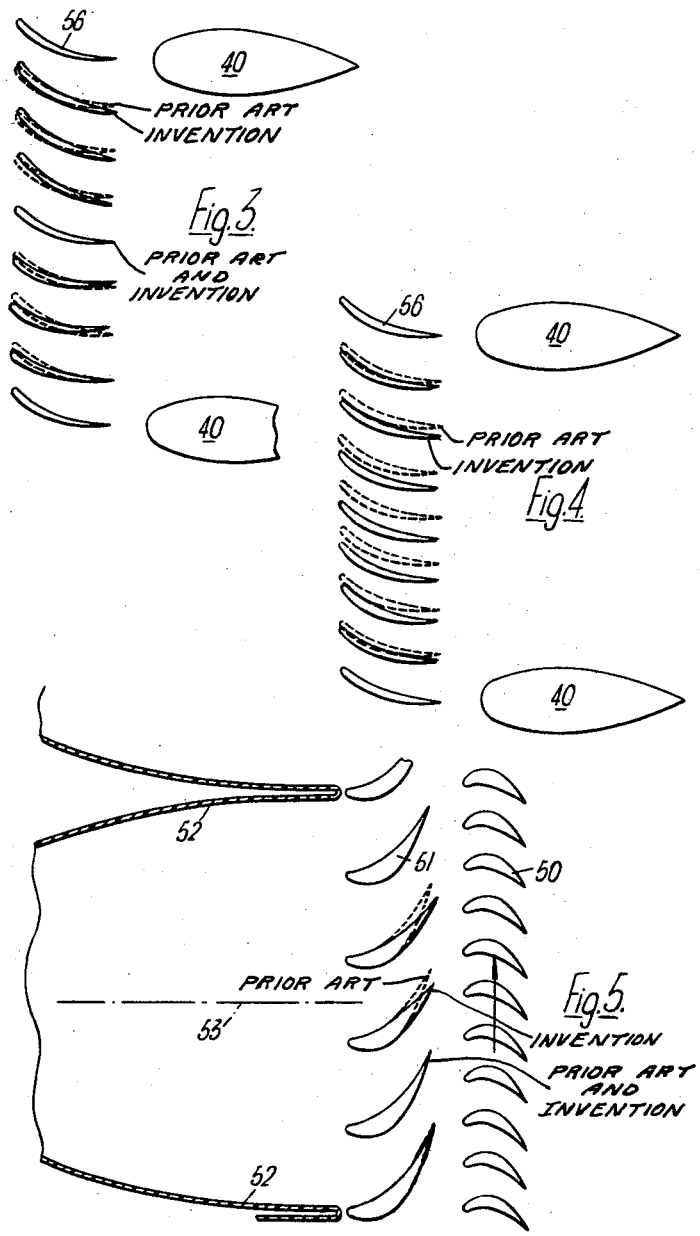

United States Patent Office 3,169,747
Patented Feb. 16, 1965

3,169,747
ROTARY BLADED POWER CONVERSION MACHINES
Donald Glenfield Seymour, Bristol, England, assignor to Bristol Siddeley Engines Limited
Filed Jan. 2, 1962, Ser. No. 163,669
Claims priority, application Great Britain, Jan. 6, 1961, 668/61
13 Claims. (Cl. 253—39)

This invention relates to rotary bladed fluid flow power conversion machines of the kind comprising a stator and a rotor and having co-axially arranged surfaces defining between them a flow passage for the working fluid, at least one ring of blades carried by the rotor and at least one ring of blades carried by the stator, the blades projecting into the flow passage between the co-axially arranged surfaces.

In such machines the stator usually also has at least one non-coaxial surface partly defining the flow passage and arranged either upstream of the blade-containing part of the passage or downstream of it, or one or more in each position. Such surfaces are commonly formed by the arms of a spider supporting a bearing for the rotor. A spider may, depending on its shape, size and proximity to the blade-containing part of the flow passage, cause in this part of the passage a variation circumferentially of the mass flow of working fluid per unit of cross-section of the passage which in turn may, depending on the vibratory characteristics of the rotor blades and the speed at which the machine is run, excite in the rotor blades, or some of them, vibrations of such amplitude that the blades are liable to break and cause severe damage to the machine.

According to the present invention, in a machine of the kind described in which the flow passage is partly defined by a non-coaxial surface capable of causing a circumferential variation of flow of working fluid through a ring of rotor blades which would tend during operation of the machine ot cause dangerous vibration of the rotor blades, the blades of at least one ring of stator blades, sufficiently near the ring of rotor blades to be capable of modifying the flow of fluid through the ring of rotor blades, are arranged to have a compensating variation of shape, angle of attack (i.e. the angle of the blade as a whole) or spacing, such as to reduce or eliminate the vibration.

The variations in the compensating stator blades may be such as to impart to the flow of working fluid to each blade of the ring of rotor blades liable to dangerous vibration (and possibly incidentally to other rotor blades as well) a variation of velocity or direction equal in frequency to the frequency of the blade vibration.

According to an alternative approach the variations in the compensating stator blades may be such as to produce a flow variation of the same frequency but out of phase with the flow variation which the non-coaxial surface tends to produce. This is particularly applicable to compressors in which non-coaxial surfaces are formed by vanes serving as the arms of a spider supporting a bearing for the downstream end of the rotor. In this case the compensating stator blades are preferably so arranged that they tend to reduce the velocity of flow leading to regions midway between the arms of the spider, as compared with flow leading to the arms of the spider; the reason for this is that the vanes will tend to reduce the velocity of flow close to them. The variation of velocity may be produced by varying the shapes or angles of attack of the compensating stator blades so that the passages between adjacent blades converge downstream in regions midway between the vanes of the spider, and diverge downstream at the vanes of the spider.

In general the variations in the compensating stator blades may be such as to produce an at least approximately sinusoidal flow variation circumferentially of the ring of compensating stator blades.

While the expression "non-coaxial surface" has been explained above in relation to a spider having arms crossing the working fluid flow passage, the expression is intended to include in general any formation of the flow passage, such as for example a bend or a bifurcation, which will cause a circumferential variation of flow of working fluid through the blade-containing part of the flow passage.

The invention is applicable both to compressors and to turbines. In the case of compressors, vibration of rotor blades is most likely to be caused by non-coaxial formations of the flow passage downstream of the rotor blades, but the reverse holds in the case of turbines. In both cases the modification of a ring of stator blades according to the invention is most advantageously applied to a ring of stator blades lying between the rotor blades in question and the non-coaxial formation causing the variation in flow through the rotor blades.

Where a machine includes more than one blade stage (each stage comprising a ring of stator blades and a ring of rotor blades) it may be that the rotor blades of one or more stages next adjacent a non-coaxial part of the flow passage are, by reason of their vibratory characteristics, not subject to vibration in resonance with any component of the flow variation caused by the non-coaxial part of the flow passage, but that the rotor blades of a stage further removed are liable to such resonant vibration. In such a case the flow variations capable of causing the resonant vibration can, in general, be sufficiently altered by modification of any of the rings of stator blades lying between the rotor blades liable to resonance and the non-coaxial part of the flow passage, but it is preferred to apply the modifications to the ring of stator blades nearest to the non-coaxial part of the flow passage.

In the accompanying drawings, used for further explanation and description of the invention:

FIGURE 1 is a diagrammatic longitudinal section through a low pressure axial flow compressor and part of an axial flow high pressure compressor forming part of a gas turbine engine;

FIGURE 2 shows a stage of axial flow compressor blading, followed by spider vanes in a flat "developed" condition;

FIGURES 3 and 4 correspond to part of FIGURE 2 but with the stator blading modified in different ways; and FIGURE 5 is a similar development of part of a stage of turbine blading.

In FIGURE 1 the low pressure compressor 31 comprises a stator casing 32 and a rotor drum 33 having co-axially arranged surfaces 34 and 35 defining between them a flow passage 36 for the working fluid. The stator casing carries six rings of stator blades S1, S2 . . . S6 and the rotor drum six rings of rotor blades R1, R2 . . . R6, the blades projecting into the flow passage 36 and constituting six stages, each stage comprising a ring of rotor blades and a following ring of stator blades having the same suffix number.

The rotor 33 is driven by a turbine rotor of the engine (not shown) through a shaft 37 journalled in a bearing 38 carried in a casing 39 attached to the stator casing 32 by a number of hollow vanes 40 forming a spider. The casing 39 also carries a bearing 41 in which is journalled a spigot 42 supporting the forward end of a high pressure compressor rotor 43 driven by another turbine rotor of the engine. The shaft 37 and the spigot 42 are coupled by gearing 44 and 45 to the shafts 46 and 47 which extend radially through one of the vanes 40 and are coupled to auxiliary equipment (not shown) mounted outside the stator casing 32. The vanes 40 constitute non-coaxial surface parts defining partly the flow passage 36 downstream of the blade-containing part of the passage. The vanes 40 have of necessity to be a certain minimum size to accommodate the shafts 46 and 47 and other equipment (not shown) such as pipes for lubrication and ventilation, and they will cause a variation circumferentially of the mass flow of working fluid per unit of cross section of the passage. At fluid flow speeds less than Mach 1 these disturbances, in the form of variations in flow velocity, will extend upstream of the vanes. In a passage which is undivided by blades, so that the flow is free to "spread out" in all directions, the disturbances will persist a distance upstream of the vanes which is dependent on their dimensions and the sharpness of their leading edges, but where the passage is divided by blades, such as the stator blades S and the rotor blades R, very little attenuation of the disturbances takes place between the blades of any one ring, so that in practice it may be taken that the attenuation of the disturbances with upstream distance will not be greater than that which would occur in an undivided passage in a distance equal to the sum of the axial clearances between adjacent blade rings and between the last blade ring S6 and the vanes 40.

If the sum of the axial clearance between the last rotor blade ring R6 and the stator ring S6 and between the stator ring S6 and the vanes 40 or other obstructions is made sufficiently great, the disturbances will be so attenuated as not to be capable of causing dangerous vibrations of any of the rings of rotor blades, but this involves an increase in length of the machine and therefore a penalty in weight and cost. By placing the vanes close behind the last ring of stator blades S6 this penalty is eliminated but the disturbances will be transmitted at potentially dangerous levels a substantial distance upstream through the blade-containing part of the flow passage, for example as far as the rotor blades R4, and in that case, if any of the rotor blades R4, R5 or R6 has a natural period of vibration which is equal to or a multiple of the period of the fundamental exciting force produced by the disturbances (i.e. the product of the number of vanes by the rotational speed of the rotor) those blades will be set in resonant vibration and may break.

It will be seen that in such an arrangement the rings of stator blades act to transmit the disturbances to the rotor blades. In applying the present invention to this case one or more of the rings of stator blades would be modified so as to superimpose additional variations in the flow of working fluid through the rotor blades subject to vibration which may wholly or partly cancel out the original flow variations caused by the vanes but in any case act to reduce the vibration excited by the original flow variations.

In so applying the invention it is not necessary to provide complete compensation of narrow regions of seriously disturbed flow, which might well require blade modifications of such magnitude as to seriously prejudice the efficiency of the machine, but only to provide a periodic, preferably sinusoidal, variation which will compensate for the disturbed flow, and which may be at the fundamental frequency of the flow disturbance or an integral multiple of it. The problem is thus resolved into one of providing a sinusoidal circumferential variation of mass flow of sufficient amplitude and suitable phase to prevent at least to a substantial extent the rotor blade variations which would have been produced by the original disturbance.

In some cases the frequency and phase of the compensating variation can easily be determined by consideration of the form of the non-coaxial parts causing the disturbances. This would be the case for example when the disturbance is caused by a number of similar equally spaced vanes crossing the flow passage, such as the vanes 40 of FIGURE 1.

In other cases it may be necessary to determine the frequency and phase experimentally. This may be done by first running the unmodified machine to determine, by the use of well known techniques, the frequency of a dangerous rotor blade vibration. Dividing this frequency by the rotational speed at which it occurs gives the number of full waves to be provided by modification of a ring of stator blades. The machine is then provided with such a modified ring of stator blades and further tested to find the best phasing of the modified ring. Further tests may then be carried out with the blade rings having different amounts of modification so as to select the one giving adequate security against blade vibration with minimum penalty in the way of reduced efficiency of the machine. Where such a penalty occurs it is clearly advantageous to keep the amount of blade modification to the minimum which will reduce the rotor vibration to a safe value.

There are several ways in which a ring of stator blades may be modified to produce a sinusoidal circumferential variation of velocity in a subsonic stream of working fluid. In the case of a compressor ring the turning angles of individual blades may be varied by varying their exit angles while maintaining their entry angles constant; in other words, by using blades of different camber. This is illustrated in FIGURE 2, which shows in flat development a ring of twenty-four exit guide blades S6 (corresponding to the blades S6 of FIGURE 1) preceded by a ring of rotor blades R6 and followed by three equally spaced spider vanes 40. In such an arrangement each of the vanes 40 would produce a flow velocity disturbance extending upstream to the region of the rotor blades R6, so that if the rotor were turning at N revolutions per second then each rotor blade would be subject to an exciting force of frequency 3N. If, within the working speed range of the machine, this frequency, or an integral multiple of it, equalled the natural vibration frequency of the rotor blades R6, these blades would be set in resonant vibration and might well reach an amplitude of vibration which would cause them to break. Clearly, in such a layout the vanes 40 impede the flow, so that a region of reduced velocity is produced ahead of each vane, and a suitable modification of the stator blades S6 will be one which will induce a greater velocity upstream of the vanes and reduce it upstream of points midway between the vanes. In FIGURE 2 an approximately sinusoidal modification of velocity is achieved by varying the stator blade exit angles so that the spaces between the blades have the greatest degree of downstream divergence at the vanes, diverge slightly less at small distances from the vanes, and converge in regions midway between the vanes. In the subsonic flow which occurs in this case, the velocity is increased by a divergent flow passage and decrease by a convergent flow passage. The amount of modification required for each blade can, in a case of this kind, be estimated by an analytical investigation.

The table below gives, by way of example, estimated changes of fluid exit angles required to produce velocity changes of plus and minus ten percent for a ring containing twenty-four blades and for numbers of full waves from one to six. In each case the change of angle starts about midway between the leading and trailing edges of the blade. The figures for three full waves correspond to the layout shown in FIGURE 2. If however the frequency of the troublesome vibration of the rotor blades is twice the frequency of the exciting disturbances, then the blades should preferably be modified according to the figures shown in the last column for six full waves. If there were only two obstructing vanes then the figures for two full waves would be used instead, or those for four or six full waves if the troublesome vibration were a corresponding integral multiple of the exciting disturbance. These values can be multiplied by a suitable factor for cases in which, dependent on the actual design of a particular machine, velocity changes greater than or less than plus and minus ten percent are estimated to be required, and the effects should be checked experimentally in the machine, preferably starting with less than the estimated values.

| Blade Number | Number of complete waves | | | | | |
|---|---|---|---|---|---|---|
| | 1 | 2 | 3 | 4 | 5 | 6 |
| 1 | 0 | 0 | 0 | 0 | 0 | 0 |
| 2 | 1.48 | 2.86 | 4.05 | 4.96 | 5.53 | 5.73 |
| 3 | 2.86 | 4.96 | 5.73 | 4.96 | 2.86 | 0 |
| 4 | 4.05 | 5.73 | 4.05 | 0 | −4.05 | −5.73 |
| 5 | 4.96 | 4.96 | 0 | −4.96 | −4.96 | |
| 6 | 5.53 | 2.86 | −4.05 | −4.96 | 1.48 | |
| 7 | 5.73 | 0 | −5.73 | | 5.73 | |
| 8 | 5.53 | −2.86 | −4.05 | | 1.48 | |
| 9 | 4.96 | −4.96 | | | −4.96 | |
| 10 | 4.05 | −5.73 | | | −4.05 | |
| 11 | 2.86 | −4.96 | | | 2.86 | |
| 12 | 1.48 | −2.86 | | | 5.53 | |
| 13 | 0 | | | | 0 | |
| 14 | −1.48 | | | | −5.53 | |
| 15 | −2.86 | | | | −2.86 | |
| 16 | −4.05 | | | | 4.05 | |
| 17 | −4.96 | | | | 4.96 | |
| 18 | −5.53 | | | | 1.48 | |
| 19 | −5.73 | | | | −5.73 | |
| 20 | −5.53 | | | | −1.48 | |
| 21 | −4.96 | | | | 4.96 | |
| 22 | −4.05 | | | | 4.05 | |
| 23 | −2.86 | | | | −2.86 | |
| 24 | −1.48 | | | | −5.53 | |

In the case of 2, 3, 4 and 6 complete waves, the series of figures is repeated for the remainder of the blades.

In the case of blade rings having such a large turning angle that no increase in turning angle can be permitted, it will be necessary to apply modifications in one direction so that the exit angle, instead of varying within a range of say 0 to ±6° varies within a range of 0 to 12°. This will result in a 6° mean change of swirl angle at exit and a small performance penalty could result.

Variation of the blade exit angle without change of entry angle is the ideal form of modification but is inconvenient in that it necessitates the provision of blades of several different shapes. In the case of blade rings having a small or moderate turning angle, small variations in the entry angle can sometimes be accepted, and in that case the required modification can be made by turning the blades as a whole, i.e. changing the angle of attack of each blade as a whole, as illustrated in FIGURE 3, through an angle depending on the angular position of the blade around the machine. For this purpose blades may be set at different angles relative to location abutments or the like on their attachment roots, or blades which can be clamped at different angles by differently shaped spacing members may be used. In some cases, especially where a large turning angle is required, an additional ring of blades may be employed, the variations preferably being confined to the downstream ring of blades. In this case the upstream ring may have more blades and a smaller chord (that is to say, a smaller distance from the trailing edge to the leading edge of each blade) than would be appropriate if the second ring were not provided.

Flow variations can also be induced by varying the spacing of blades in a row. An example is shown in FIGURE 4. It will be seen that the spacing varies so that the blades are closest together where they are required to turn the flow through angles greater than the average in order to direct the flow round one side of the arms of the spider. Working downwardly from the top vane 40, the spacing of the blades is first increased so that a bigger discrepancy is caused between the fluid exit angle and the blade exit angle; the fluid therefore flows more towards the middle of the passage between the vanes than it would otherwise have done. The stator blades opposite the middle of the passage are not required to produce any divergence from the axial direction and their spacing is therefore retained at the mean value. Close to the lower vane, extra turning of the air is required to guide it round the lower vane, and to produce this effect the spacing is reduced.

FIGURE 5 illustrates by way of example an application of the invention in a turbine, the figure again showing a section of blading in the flat "developed" condition. In this case a row of rotor blades 50 is preceded by a row of nozzle guide blades 51 receiving hot gas from a combustion system including a number of flame tubes partly defined by circumferentially spaced radial walls 52. For the purpose of illustration it is assumed that the hot gas arrives at the nozzle guide blades adjacent the flame tube walls with a smaller total velocity and pressure head than it has in the region of the centre-line 53 of a flame tube and that consequently the mass flow of gas discharged by the nozzles in the region of the centre-line will be somewhat greater than that discharged by the wall region nozzles, even if the nozzles are operating under choked conditions, that is to say, with a pressure drop through the nozzles sufficient to produce a velocity of Mach 1 in the throat of nozzles. The periodic circumferential variation of mass flow thus produced may excite the rotor blades 50 into dangerous resonant vibration, but by modifying the guide blade exit angles so as to increase the exit angle downstream of the flame tube walls and to decrease the exit angle in regions midway between the walls a compensating variation is superimposed which will reduce the vibration forces on the rotor blades by introducing variations in the circumferential whirl of fluid reaching the rotor blades, such that there is less circumferential whirl at midpoints between adjacent walls than at the walls.

I claim:

1. A rotary bladed fluid flow power-conversion machine operating with a compressible working fluid and comprising a stator and a rotor having co-axially arranged surfaces defining between them part of a flow passage for the working fluid, at least one ring of blades carried by the rotor and at least one ring of blades carried by the stator, the blades projecting into the said part of the flow passage, an adjacent flow passage part including a division wall causing differences in the flow direction on opposite sides of the division wall and thereby tending to cause transmission of a circumferential variation of flow to at least one ring of the rotor blades having a natural vibration mode such that the blades would be set in vibration by the said circumferential variation of flow within the working rotary speed of the machine, and means between the said adjacent flow passage part and the said ring of rotor blades to prevent said transmission, the said means comprising a non-uniform arrangement of at least one ring of stator blades such as to convert the circumferential variation of flow to a form not liable to excite vibration of the said rotor blades.

2. A machine according to claim 1, in which the non-uniformly arranged ring of stator blades imparts to the flow of working fluid to each blade of the ring of rotor blades liable to vibrate a cyclic variation of velocity equal in frequency to the frequency of the blade vibration.

3. A machine according to claim 1 in which the non-uniformly arranged ring of stator blades imparts to the flow of working fluid to each blade of the ring of rotor blades liable to vibrate a cyclic variation of direction equal in frequency to the frequency of the blade vibration.

4. A machine according to claim 1 in the form of a compressor having a plurality of division walls formed by the arms of a spider supporting a bearing for the downstream end of the rotor, and in which the spacing between the compensating stator blades varies so that the blades are closer together on that side of each spider arm facing the oncoming rotor blades than on the other side.

5. An axial flow power-conversion machine utilising a compressible fluid, comprising a stator and a rotor having coaxially arranged surfaces defining between them a flow passage for working fluid, at least one ring of blades carried by the rotor and at least one ring of blades carried by the stator, the blades projecting into the flow passage between the coaxially arranged surfaces, and including a division wall which forms part of the machine and which tends to reduce the velocity of the fluid flow in a region aligned axially with the said division wall, the stator including a ring of compensating blades defining flow passages between adjacent blades which diverge downstream in the region axially aligned with the said division wall, and converge downstream in regions remote from the said division wall.

6. A rotary bladed turbine comprising a stator and a rotor having co-axially arranged surfaces defining between them a flow passage for working fluid, at least one ring of blades carried by the rotor and at least one ring of blades carried by the stator, the blades projecting into the flow passage between the co-axially arranged surfaces, and including at least one flame tube having walls which act as non-coaxial surfaces and consequently give rise to a circumferential variation of flow tending to cause vibration of the said ring of rotor blades and including means to modify the flow of fluid through said ring of rotor blades so as substantially to eliminate the said vibration of such ring of rotor blades comprising the blades of at least one ring of stator blades lying between the said ring of rotor blades and the flame tube and having a compensating circumferential variation such as substantially to eliminate the vibration of the said ring of rotor blades, the said compensating variation producing variations in the angle of flow of the working fluid leaving the stator blades such that there is less circumferential whirl at midpoints between adjacent walls of the flame tube than at the walls.

7. An axial flow power-conversion machine utilising a compressible fluid, comprising a stator with at least one ring of stator blades, and a rotor with at least one ring of rotor blades, the machine including also a stationary part which tends to reduce the velocity of flow in at least one region of one of the said rotor blade rings and thereby tends to cause the velocity of the flow impinging on each of the rotor blades in that ring to vary cyclically so as to cause the rotor blades to vibrate dangerously, the machine being characterised by having circumferential variations in the stator blades of at least one ring to reduce at least the component of the flow velocity in the direction in which the said rotor blades vibrate, at regions at which the stationary part causes the least reduction in velocity.

8. A machine according to claim 7, in which in order to reduce the actual velocity of flow at the ring of rotor blades liable to vibrate, the varying stator blades are arranged to cause the flow of working fluid to converge downstream in the regions at which the reduction of velocity is required.

9. A machine according to claim 7, in which the varying stator blades are arranged so that the passages between adjacent blades converge downstream in regions in which velocity reduction is required, and diverge downstream in other regions.

10. A machine according to claim 7, in which the flow variation created circumferentially by the varying stator blades is substantially sinusoidal.

11. An axial flow compressor comprising a stator and a rotor having co-axially arranged surfaces defining between them a flow passage for working fluid, at least one ring of blades carried by the rotor and at least one ring of blades carried by the stator, the blades projecting into the flow passage between the co-axially arranged surfaces, and including a stationary part downstream of the rotor which tends to reduce the velocity of flow at one ring of blades of the rotor in the region axially aligned with the stationary part, thus tending to cause vibration of the blades of the said one rotor ring, the stator including a ring of compensating blades lying between the stationary part and the said one rotor ring and defining flow passages between adjacent blades which diverge downstream in the said region axially aligned with the stationary part, and converge downstream in other regions remote from the stationary part.

12. An axial flow compressor comprising a stator and a rotor having co-axially arranged surfaces defining between them a flow passage for working fluid, at least one ring of blades carried by the rotor and at least one ring of blades carried by the stator, the blades projecting into the flow passage between the co-axially arranged surfaces, and including a stationary part downstream of the rotor which tends to reduce the velocity of flow at one ring of blades of the rotor in the region axially aligned with the stationary part, thus tending to cause vibration of the blades of the said one rotor ring, the stator including a ring of compensating blades lying between the stationary part and the said one rotor ring and defining flow passages between adjacent blades which vary so as to cause the fluid flow to diverge downstream in the said region axially aligned with the stationary part, and to converge downstream in other regions remote from the stationary part.

13. A rotary bladed compressor comprising a stator and a rotor having co-axially arranged surfaces defining between them a flow passage for working fluid, at least one ring of blades carried by the rotor and at least one ring of blades carried by the stator, the blades projecting into the flow passage between the co-axially arranged surfaces, the machine including a spider supporting a bearing for the downstream end of the rotor and providing non-coaxial surfaces which partly define the fluid flow passage and consequently give rise to a circumferential variation of flow tending to cause vibration of said ring of rotor blades, and including means to modify the flow of fluid through said ring of rotor blades so as substantially to eliminate said vibration of the ring of rotor blades comprising the blades of at least one ring of stator blades, sufficiently near the said ring of rotor blades to be capable of modifying the flow of fluid through the said ring of rotor blades, arranged with a compensating circumferential variation such as substantially to eliminate the vibration of the said ring of rotor blades, the compensating circumferential variation comprising a varying spacing between the compensating stator blades so that the blades are closer together on that side of each spider arm facing the oncoming rotor blades than on the other side.

References Cited by the Examiner
UNITED STATES PATENTS

| 821,347 | 5/06 | Elling | 253—65 |
|---|---|---|---|
| 1,525,814 | 2/25 | Lasche | 253—39 |
| 1,534,721 | 4/25 | Lasche | 253—39 |
| 1,697,174 | 1/29 | Forner | 253—78 |
| 3,006,603 | 10/61 | Caruso | 253—77.4 |

FOREIGN PATENTS 11,890    1911    Great Britain.

SAMUEL LEVINE, *Primary Examiner.*
WALTER BERLOWITZ, *Examiner.*